United States Patent [19]

Simon Bacardit

[11] Patent Number: 4,917,222
[45] Date of Patent: Apr. 17, 1990

[54] SHOCK ABSORBER

[75] Inventor: Juan Simon Bacardit, Barcelona, Spain

[73] Assignee: Bendix Espana, Barcelona, Spain

[21] Appl. No.: 259,835

[22] Filed: Oct. 19, 1988

[30] Foreign Application Priority Data

Oct. 26, 1987 [EP] European Pat. Off. ........ 87500071.3

[51] Int. Cl.⁴ .............................................. F16F 9/34
[52] U.S. Cl. ..................... 188/275; 137/39; 188/299; 188/322.14; 188/322.15
[58] Field of Search .............. 188/275, 299, 322.13, 188/322.14, 322.15; 280/714; 137/38, 39

[56] References Cited

U.S. PATENT DOCUMENTS

| 2,774,448 | 12/1956 | Hultin | 188/88 |
| 3,039,566 | 6/1962 | Rumsey | 188/88 |
| 3,127,958 | 4/1964 | Szotak | 288/88 |
| 3,338,347 | 8/1967 | Avner | 188/88 |
| 3,380,560 | 4/1968 | Katz | 188/275 |
| 4,638,896 | 1/1987 | Poyser | 188/299 |

FOREIGN PATENT DOCUMENTS

| 3231739 | 3/1984 | Fed. Rep. of Germany . | |
| 3631714 | 4/1988 | Fed. Rep. of Germany | 188/299 |
| 59-106733 | 6/1984 | Japan . | |
| 59-106734 | 6/1984 | Japan . | |
| 1072463 | 6/1967 | United Kingdom . | |
| 1363303 | 8/1974 | United Kingdom . | |
| 2159604 | 12/1985 | United Kingdom . | |

Primary Examiner—George E. Halvosa
Attorney, Agent, or Firm—Larry J. Palguta; Ken C. Decker

[57] ABSTRACT

A shock absorber comprises a tubular working cylinder (12) to be mounted on a suspended part of a vehicle, with a piston rod assembly (26) received slidably in the working cylinder (12) having an end (28) to be mounted on a fixed part of the vehicle. The piston rod assembly (26) has at its free end a piston member (40) cooperating with the working cylinder (12) to divide the interior thereof into an upper (52) and a lower working chamber (50), with a valve mechanism in the piston member (40) to permit controlled two-way flow between the upper and lower working chambers (52, 50). A mass (58) is mounted in the shock absorber and displaceable in response to a predetermined acceleration of the shock absorber from a first position in which the mass closes a passage (56, 54, 90) between the working chamber (52) and a reservoir (50; 22), and a second position in which the passage (56, 54, 90) is open.

8 Claims, 3 Drawing Sheets

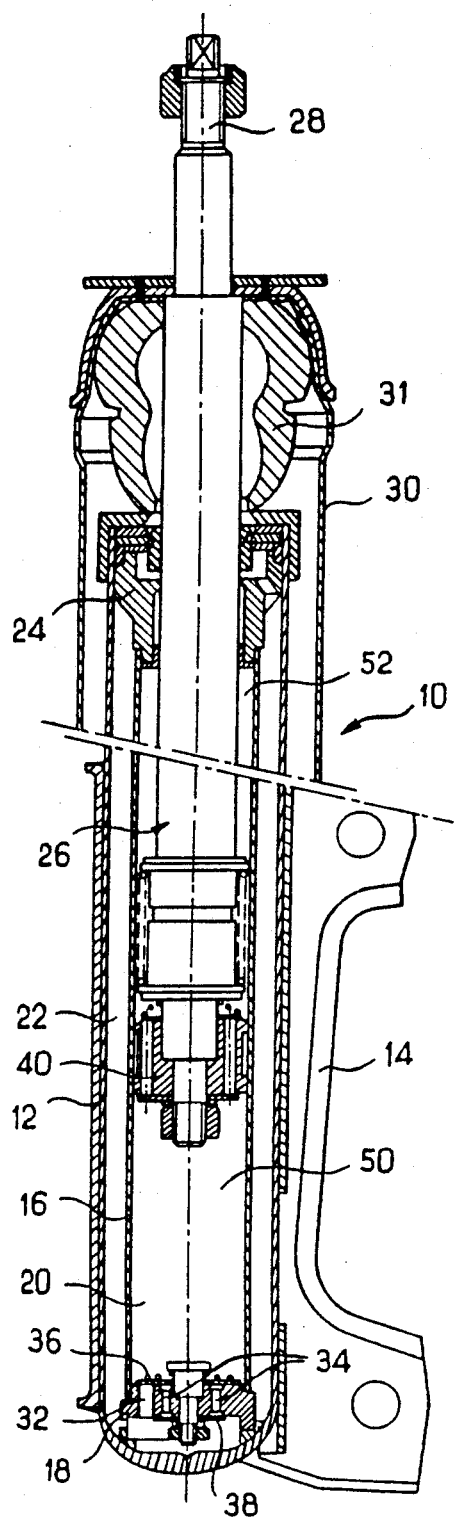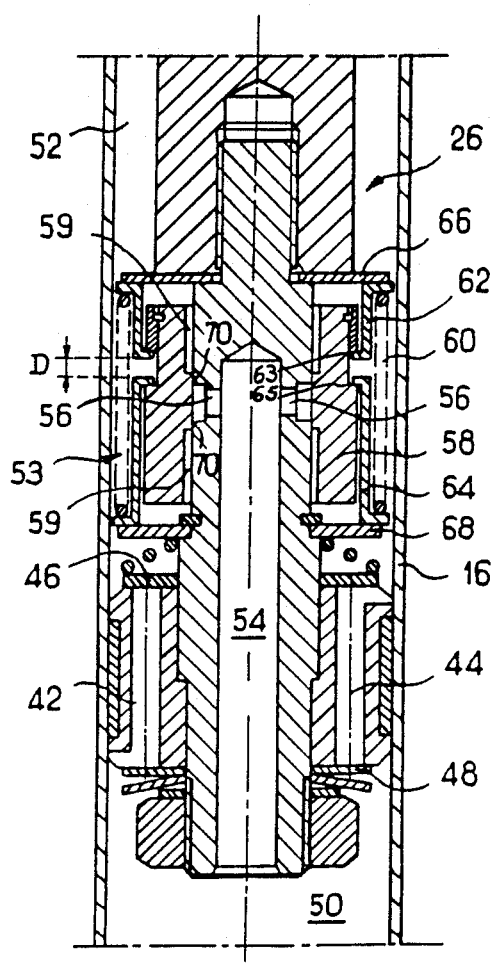
FIG_1
FIG_2

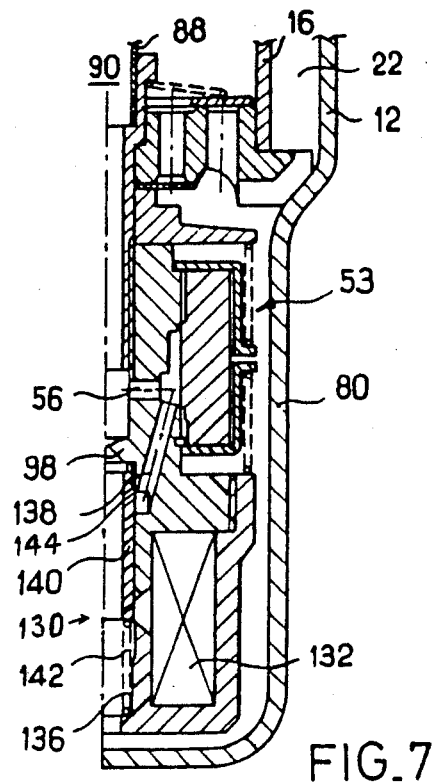
FIG_7
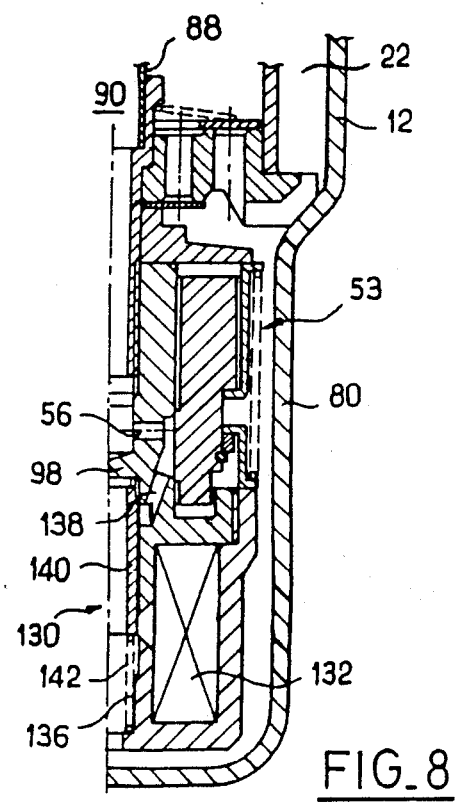
FIG_8
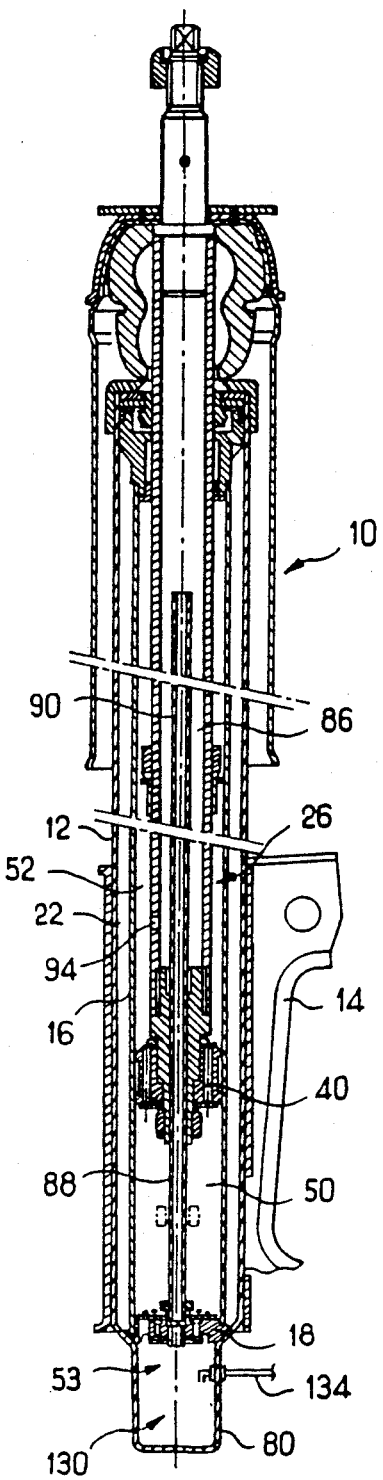
FIG_6

SHOCK ABSORBER

The present invention relates to shock absorbers for automotive vehicles and, more particularly, to a shock absorber having an inertial valve intended to vary the response characteristics of the shock absorber.

In order to deal with varying road conditions it is desirable to be able to change the response characteristics, or rate of stiffness, of a vehicle's shock absorbers which serve to provide hydraulic damping of the vehicle's suspension.

Various types of electrically controlled variable rate shock absorbers have been previously proposed. For example, U.S. Pat. No. 3,039,566 describes a hydraulic shock absorber in which a solenoid valve simultaneously vents the upper and lower working chambers to a reservoir, thus to selectively change the characteristics of the suspension. This arrangement had the disadvantage that the shock absorber structure was complex and that it needed special electrical control circuitry for the valve.

It is therefore an object of the present invention to provide a shock absorber of simple structure and which is adapted to vary its characteristics automatically in response to a predetermined set of conditions.

According to the present invention there is provided a shock absorber comprising a tubular working cylinder destined to be mounted on a suspended part of a vehicle, a piston rod assembly slideably received in the working cylinder and having an end destined to be mounted on a fixed part of a vehicle, the rod assembly having at its free end a piston member cooperating with the working cylinder to divide the interior thereof into an upper and a lower working chamber, valve means in the piston member to permit controlled two-way flow between the upper and lower working chambers characterized in that it further comprises a mass mounted in the shock absorber and displaceable in response to a predetermined acceleration of the shock absorber from a first position in which the mass closes a passage between the upper working chamber and a reservoir, to a second position in which the passage is open.

The invention will now be described by way of example with reference to the accompanying drawings, in which:

FIG. 1 is a longitudinal section through a shock absorber according to a first embodiment of the invention;

FIG. 2 is a detailed view of a part of FIG. 1;

FIG. 6 is a longitudinal section, similar to FIGS. 1 and 3, showing a third embodiment of the invention; and FIGS. 7 and 8 are alternative detailed views of a part of FIG. 6.

Figure 5:
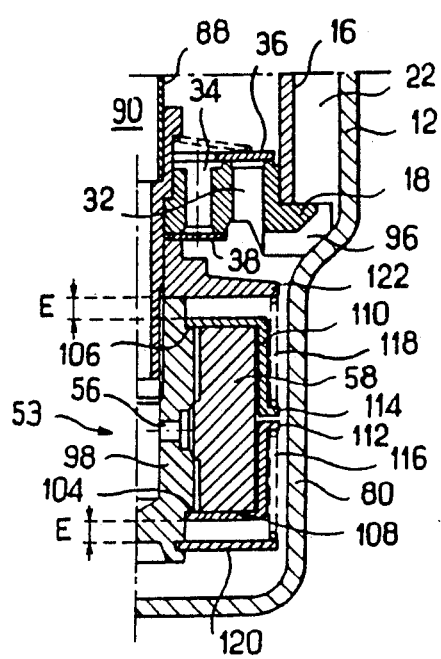
FIG. 4 and 5 are alternative detailed views of a part of FIG. 3.

As shown in FIG. 1, the variable rate shock absorber 10 comprises a cylindrical outer shell 12 to which is secured a bracket 14 by means of which the shell 12 may be mounted on a support for one of the wheels of a vehicle (not shown). An inner cylinder 16 extends within the outer shell 12 and is closed at one end by a two-way valve assembly 18 which allows communication between the interior 20 of the inner cylinder 16 and an annular reservoir 22 formed between the inner cylinder 16 and the outer shell 12. An annular closure member 24 is mounted in the open end of outer shell 12 and both retains the inner cylinder 16 and closes the annular reservoir 22.

The shock absorber 10 further comprises a piston assembly, generally shown 26, which extends within the inner cylinder 16, coaxially therewith. One end of the piston assembly 26 forms a mounting bolt 28 by means of which the shock absorber 10 is secured to the bodywork of the vehicle (not shown). A protective cover 30 is secured to the piston assembly 26 and an elastomeric stop ring 31 is mounted on the piston assembly 26 between the cover 30 and the closure member 24.

The valve assembly 18 comprises, in a conventional manner, two sets of fluid passages 32 and 34 each of which is closed at a respective opposite end by an associated sprung valve member 36 and 38. At the end of the piston assembly 26 inside the inner cylinder 16 is mounted a piston member 40. As is more clearly shown in FIG. 2 the piston member 40 has two sets of fluid passages 42 and 44 passing therethrough, each of which is closed at a respective opposite end by an associated sprung valve member 46 and 48. Sprung valve members 46 and 48 allow controlled, two-way fluid flow through the piston member 40 between a working chamber 50, formed between the piston member 40 and the valve assembly 18, and an annular volume 52 formed between the piston member 40 and the closure member 24.

In accordance with the invention the shock absorber 10 further comprises an inertial valve assembly 53 which is intended to provide an additional fluid passage between the working chamber 50 and the annular volume 52. As shown in FIG. 2 the end of piston assembly 26 has formed therein an axial blind bore 54 which communicates with the annular volume 52 by way of radial passages 56. The radial passages 56 are normally closed by an annular inertial mass 58 which is slideably mounted about the end of piston assembly 26. The inertial mass 58 is urged towards its illustrated rest position by a spring 60 which is confined between two annular collars 62 and 64, each of which abuts, in the rest position, an associated stop 66 and 68 fixedly mounted on the piston assembly 26. Each collar 62 and 64 engages an associated annular shoulder 63 and 65 on the inertial mass 58. The two annular shoulders 63 and 65 are spaced apart so that the mass 58 may slide in either direction against the force of spring 60 moving one of the collars 62,64 away from its stop 66,68 towards the other collar. As the opposing edges of the collars 62,64 are spaced apart a distance D, the inertial mass 58 is able to move upwards or downwards (when viewing the drawings) a distance D fom the illustrated rest position.

The edges of the radial passages 56 are chamfered, 70, so that movement of the mass 58 from its rest position opens the passages 56 progressively. The inner surface of the mass 58 is formed with longitudinal grooves 59 which serve as fluid passages and guideways.

In use the annular volume 52 and the working chamber 50 are filled with a hydraulic fluid while the annular reservoir 22 is only partly filled with hydraulic fluid, the remaining portion containing air or gas at a pressure above or equal to atmospheric pressure.

In operation, the piston assembly 26 will assume a nominal position intermediate the extremities of the inner cylinder 16. In the event that the wheel associated with the shock absorber encounters a bump within a predetermined order of magnitude, a force will be applied to the free end of the shock absorber tending to displace the outer shell 12 and inner cylinder 16 upwardly towards the mounting bolt 28 attached to vehicle's frame. This force will produce a pressure differential across the piston member 40. If the wheel associated with the shock absorber falls into a hole, the free end of the shock absorber will be subjected to a force tending to displace the outer shell 12 and the inner cylinder 16 vertically downwards, away from the mounting bolt 28 with the shock absorber in extension. This force will cause a pressure differential across the piston member 40 and the spring loaded valve 48, causing the fluid to flow through the permanent passage 44 of the piston member 40, which will allow the movement. In turn, the pressure differential across the valve assembly 18 will cause the fluid to flow between the annular reservoir 22 and working chamber 50 which will compensate for the volume increase formed by the extension of the shock absorber.

If the wheel associated with the shock absorber 10 encounters a bump or a hole of such a size that the acceleration of the piston assembly 26 exceeds a predetermined value, then the inertial valve assembly 53 comes into operation. For example, if the wheel encounters a large bump the outer shell 12 will be forced upwards at such a speed that, due to the resistance of fluid flow through the piston member 40, the piston assembly 26 is also forced upwards with an acceleration which exceeds the predetermined value. The inertial force exerted by the inertial mass 58 will exceed the restoring force exerted by the spring 60 and the mass 58 will then move downwards relative to the piston assembly 26. Such a movement of the mass 58 will expose the chamfered surface 70 and thus open radial passages 56 and provide a free passage for fluid flowing from the working chamber 50 to the annular volume 52. The stiffness characteristics of the shock absorber 10 will thus be considerably reduced and the effect of the bump will be minimized.

In a similar way, if the wheel associated with the shock absorber 10 falls into a hole of such a size that the acceleration of the piston assembly 26 exceeds the predetermined value, then the inertial valve assembly 53 will come into operation to minimize the effect of the shock. In this case, however, the piston assembly 26 will be accelerating downwards and thus the inertial mass 58 will move upwards with respect thereto. In the illustrated example the chamfered surfaces are similar and thus the opening characteristics of the inertial valve assembly 53 are the same in each direction. Thus, opening of the inertial valve assembly 53 will reduce the stiffness characteristics of the shock absorber and thus allow the effect of the wheel falling into the hole to be reduced.

Figure 3:
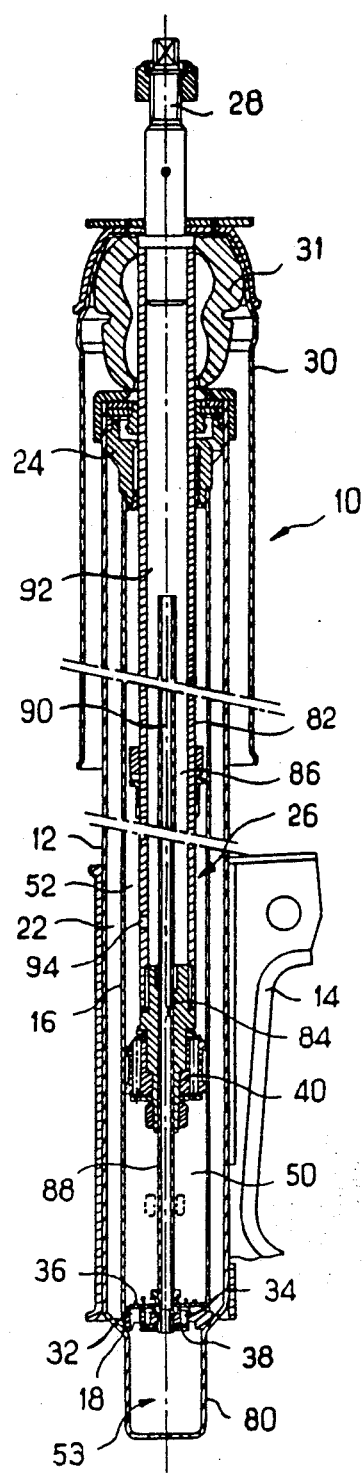
FIG. 3 is a longitudinal section, similar to FIG. 1, showing a second embodiment of the invention.

In the embodiment of FIG. 3 those elements which are common to the embodiment of FIGS. 1 and 2 carry the same reference numerals.

The shock absorber differs from that of FIG. 1 in that the inertial valve assembly 53 is located in an extension 80 of the outer shell 12. Furthermore, the piston assembly 26 comprises a tubular piston 82 on the free end of which is mounted the piston member 40 and which has an axial bore 84 which opens into the interior 86 of the tubular piston 82. A telescoping tube 88 is fixedly mounted in the valve member 18 and passes therethrough. The tube 88 is slideably and sealingly received in the bore 84 of the piston member 40 and the interior 90 of the tube 88 opens into the interior 92 of the tubular piston 82 which itself is in communication with the annular volume 52 by way of an opening 94.

Figure 4:
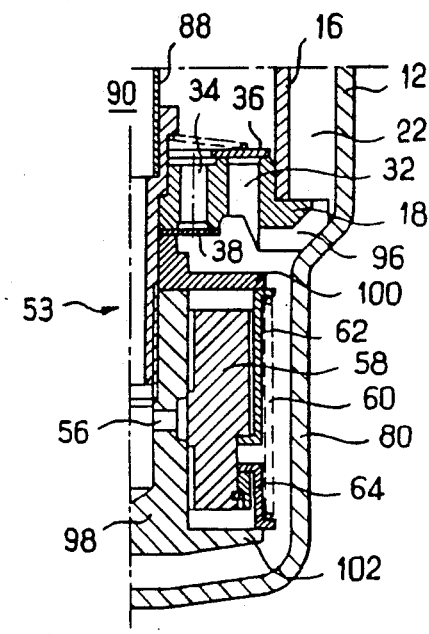

The inertial valve assembly 53 is located in the fluid passage between the interior 90 of the tube 88 and the annular reservoir 22 which communicates with the interior of extension 80 by passage 96. FIGS. 4 and 5 show alternative embodiments of inertial valve assembly 53 which differ only in the way the return spring acts on mass 58. The embodiment of FIG. 4 is analogous to that of FIG. 2 in that the mass 58 is slideably mounted on a hollow central core 98 whose interior communicates with the interior 90 of tube 88. Passages 56 open into the interior of core 98 and are closed by the mass 58 when in its illustrated rest position. The mass 58 is retained in its rest position, in a manner similar to that of FIG. 2, by a spring 60 acting on two collars 62 and 64 which are mounted between two stops 100 and 102 fixed to the core 98.

As with the previous embodiment the mass 58 moves against the force of spring 60 to open passages 56 when the wheel on which the shock absorber is mounted encounters a bump or a hole such that the inertial mass 58 undergoes an acceleration in excess of a predetermined value. As previously mentioned, opening of passages 56 allows a free fluid passage between the annular volume 52 and the annular reservoir 22 thus modifying the shock absorber characteristics in a way similar to that for the previous embodiment.

The embodiment of FIG. 5 differs from that of FIG. 4 in that the core 98 has two annular shoulders 104 and 106 against which, in the illustrated rest position, abut the inner edges of two associated annular collars 108 and 110. Each collar 108 and 110 has an external edge 112 and 114 and an associated spring 116, 118 is confined between each edge and a stop 120, 122 fixedly mounted on the core 98. The mass 58 is thus able to move either upwards or downwards against the force of one of the springs 116 and 118 a distance E corresponding to the distance between each collar 108 and 110 and its adjacent stop 120, 122. The opening of passages 56 occurs in a similar manner to that of the embodiment of FIG. 4.

The embodiments shown in FIGS. 6, 7 and 8 differ from those previously described in that, in addition to the inertial valve assembly, the shock absorber further comprises an electromagnetic valve in the fluid passage between the annular volume 52 and the annular reservoir 22 so as to provide a greater variation in the characteristics of the shock absorber. Such an electromagnetic valve is similar to that described in U.S. Pat. No. 4,832,162.

The inertial valve assembly of the embodiment of FIG. 7 is closely similar to that shown in FIG. 5. The central core 98 extends beyond that of FIG. 5 and serves as a support for the electromagnetic valve 130. The valve 130 comprises a solenoid coil 132 which is selectively actuatable by means of connecting wire 134 (see FIG. 6). The central core 98 has an axial bore 136 formed therein, the open end of which is in fluid communication with the annular reservoir 22. A fluid passage 138 links the interior of bore 136, by way of radial passage 56, with the interior 90 of tube 88. Fluid passage 138 is normally closed by a spool valve 140 which is urged into its illustrated rest position by a spring 142 located in the bore 136. Actuation of the solenoid coil 132 causes the spool valve 140 to move back against the force of spring 142 and a chamfered surface 144 on the spool valve progressively opens passage 138 allowing fluid flow between the annular reservoir 22 and the interior 90 of tube 88, which itself communicates by way of opening 94 with the annular volume 52. De-energising the solenoid coil 132 will cause the spool valve 140 to return to its rest position, under the effect of spring 142, so closing fluid passage 138.

With this embodiment it is intended that the solenoid valve 130, or proportional valve, be used in normal circumstances to modulate the rate of the shock absorber with the inertial valve 53 coming into operation only when the vertical acceleration of the wheel on which the shock absorber is mounted exceeds a predetermined limit set by the spring load acting on the mass 58. When this vertical acceleration has been exceeded the modulation of the rate of the shock absorber is a function of the chamfer of the two valves 140 and 58 which operate in parallel.

The embodiment of the shock absorber shown in FIG. 8 is similar to that of FIG. 7 except that it includes the inertial valve assembly 53 of the embodiment of FIG. 4. The structure and operation of the solenoid valve 130 is analogous to that of FIG. 7.

I claim:

1. A shock absorber comprising a tubular working cylinder to be mounted on a suspended part of a vehicle, a piston rod assembly slidably received in said working cylinder and having an end to be mounted on a fixed part of a vehicle, said piston rod assembly comprising a tubular piston having at a free end a piston member cooperating with said working cylinder to divide the interior thereof into an upper and a lower working chamber, a telescoping tube received slidably and sealingly in a bore of said piston member, a mass located in an extension of said working cylinder and mounted slidably on a tubular core and displaceable in response to a predetermined acceleration of said shock absorber from a first position in which said mass closes a first passage between said upper working chamber and a reservoir to a second position in which said first passage is open, spring means resiliently urging said mass toward a rest position wherein the first passage is closed and comprising a spring member which opposes slidable movement of the mass in either of two opposed axial directions, the spring member disposed between stops located at the tubular core, and an electromagnetic valve connected with said tubular core and comprising a spool valve displaceable by a solenoid coil between an open and a closed position, said electromagnetic valve being adapted to selectively open and close a second passage between said upper working chamber and reservoir, the electromagnetic valve operating independently of the mass.

2. A shock absorber in accordance with claim 1, wherein the first passage has chamfered edges.

3. A shock absorber in accordance with claim 1, wherein the mass is generally annular shaped and includes a stepped outer profile.

4. A shock absorber in accordance with claim 3, wherein collar means is disposed about said mass and engages said stepped profile, the collar means capturing the spring member.

5. A shock absorber in accordance with claim 4, wherein the collar means at opposite ends thereof abuts the stops and includes axially interior shoulders which engage the stepped profile of the mass.

6. A shock absorber in accordance with claim 5, wherein the spring member biases apart the opposite ends so that each engages a respective stop, the engagement of the opposite ends with the stops and the shoulders with the stepped profile positioning said mass at said rest position.

7. A shock absorber in accordance with claim 6, wherein the mass includes an annular extension at one end thereof and the tubular core includes an extension with an annular recess which receives slidably said extension of the annular mass.

8. A shock absorber in accordance with claim 7, wherein the second passage is disposed adjacent the annular recess.

* * * * *